US010986956B2

(12) United States Patent
Gamberini et al.

(10) Patent No.: US 10,986,956 B2
(45) Date of Patent: Apr. 27, 2021

(54) METHOD AND MACHINE FOR PREPARING BEVERAGES

(71) Applicant: Eurek S.R.L., Imola (IT)

(72) Inventors: Paolo Gamberini, Imola (IT); Daniele Pasqui, Imola (IT); Maurizio Zaccherini, Imola (IT)

(73) Assignee: Eurek S.R.L., Imola (IT)

( * ) Notice: Subject to any disclaimer, the term of this patent is extended or adjusted under 35 U.S.C. 154(b) by 197 days.

(21) Appl. No.: 15/769,717

(22) PCT Filed: Oct. 24, 2016

(86) PCT No.: PCT/IB2016/056378
§ 371 (c)(1),
(2) Date: Apr. 19, 2018

(87) PCT Pub. No.: WO2017/068556
PCT Pub. Date: Apr. 27, 2017

(65) Prior Publication Data
US 2019/0223657 A1    Jul. 25, 2019

(30) Foreign Application Priority Data

Oct. 23, 2015   (IT) .................. 102015000064838
Mar. 7, 2016    (IT) .................. 102016000023701
Mar. 7, 2016    (IT) .................. 102016000023723

(51) Int. Cl.
*A47J 31/54*     (2006.01)
*A47J 31/56*     (2006.01)
*F24H 1/10*      (2006.01)

(52) U.S. Cl.
CPC .......... *A47J 31/545* (2013.01); *A47J 31/542* (2013.01); *A47J 31/56* (2013.01); *F24H 1/102* (2013.01)

(58) Field of Classification Search
CPC ........ A47J 31/542; A47J 31/545; A47J 31/56; F24H 1/102
See application file for complete search history.

(56) References Cited

U.S. PATENT DOCUMENTS 6,459,854 B1 *  10/2002  Yoakim ............... A47J 31/545
                                                          392/479
2006/0027103 A1 *  2/2006  Boussemart ........... F24H 1/121
                                                          99/323.3

(Continued)

FOREIGN PATENT DOCUMENTS

JP    2005-532858 A    11/2005
JP    2006-038270 A    2/2006
(Continued)

OTHER PUBLICATIONS

International Search Report and Written Opinion in International Application No. PCT/IB2016/056378, dated Apr. 26, 2017 (19 pages).

*Primary Examiner* — Anthony J Weier
(74) *Attorney, Agent, or Firm* — Nixon Peabody LLP

(57) ABSTRACT

Method and machine for preparing beverages, in particular infusions, such as coffee or tea, having a liquid supply source supplying a liquid, in particular water, an infusion chamber and an infusion circuit, which connects said supply source to said infusion chamber; the machine having an infusion circuit with a heat exchanger and a dispensing assembly, which is configured to heat the liquid at a predetermined temperature that is lower than the boiling temperature of the liquid, for example at approximately 90°, before the infusion of the liquid itself on the inside of the infusion chamber.

24 Claims, 6 Drawing Sheets

(56) References Cited

U.S. PATENT DOCUMENTS

| | | | | |
|---|---|---|---|---|
| 2007/0277676 A1* | 12/2007 | Crivellin | ........... | A47J 31/38 |
| | | | | 99/288 |
| 2010/0005971 A1* | 1/2010 | Faccinti | ........... | A47J 31/36 |
| | | | | 99/281 |
| 2010/0206865 A1* | 8/2010 | Jaccard | ........... | A47J 31/44 |
| | | | | 219/438 |
| 2011/0127255 A1* | 6/2011 | Boussemart | ........... | F24H 9/2028 |
| | | | | 219/494 |
| 2013/0055902 A1* | 3/2013 | Berto | ........... | A47J 31/542 |
| | | | | 99/281 |
| 2013/0195433 A1* | 8/2013 | Magno | ........... | F24H 1/102 |
| | | | | 392/488 |
| 2014/0050466 A1* | 2/2014 | Giffels | ........... | H05B 3/22 |
| | | | | 392/488 |
| 2014/0305313 A1* | 10/2014 | Waldron | ........... | A47J 31/469 |
| | | | | 99/280 |
| 2015/0374168 A1* | 12/2015 | Sampoli | ........... | A47J 31/002 |
| | | | | 426/433 |

FOREIGN PATENT DOCUMENTS

| | | | |
|---|---|---|---|
| JP | 2006-263028 A | | 10/2006 |
| JP | 2009-041794 A | | 2/2009 |
| JP | 2012-088031 A | | 5/2012 |
| KR | 2015086907 | * | 7/2015 |

* cited by examiner

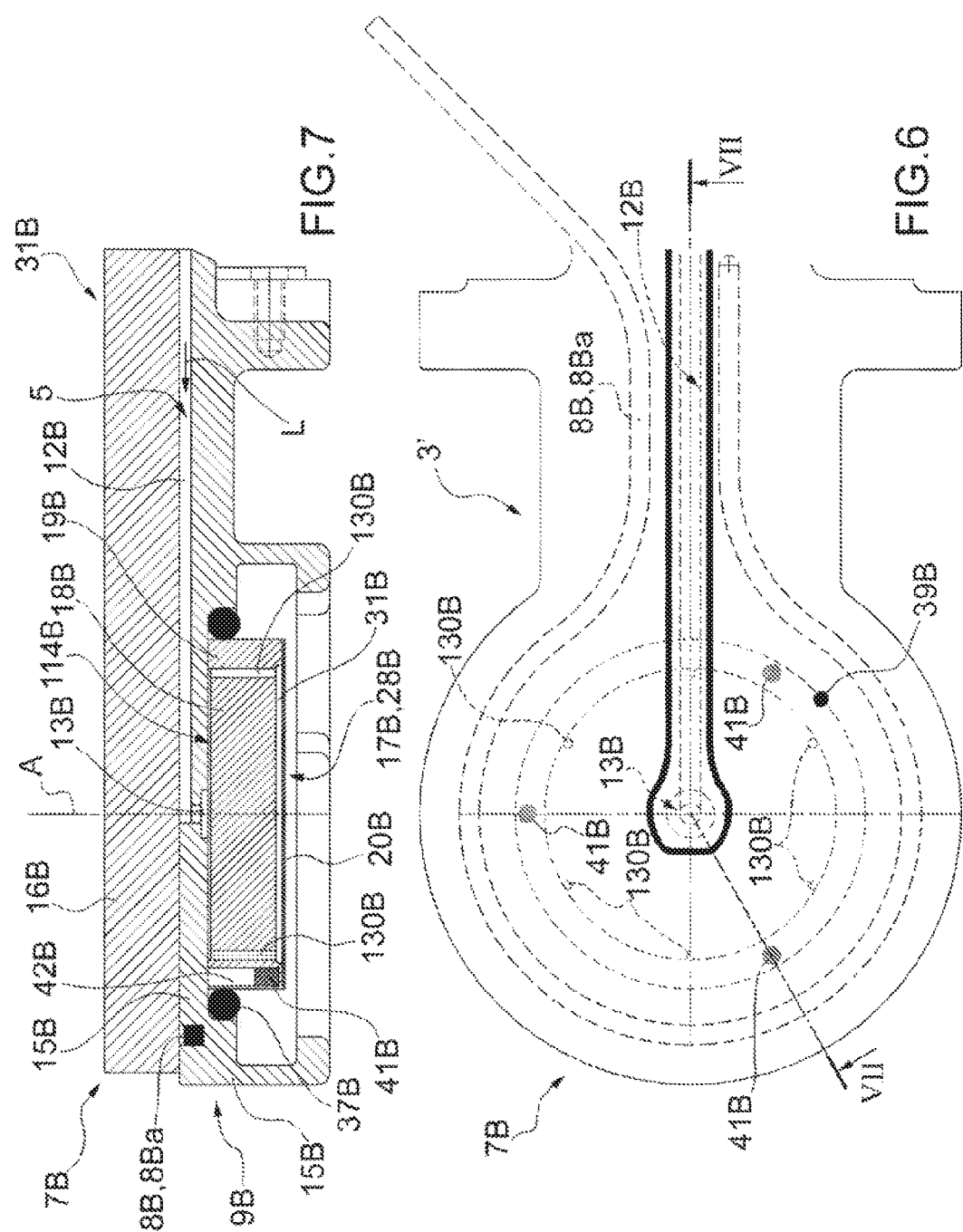

METHOD AND MACHINE FOR PREPARING BEVERAGES

TECHNICAL FIELD

This patent application relates to a method and a machine for preparing beverages, in particular in particular infusions, such as coffee or tea.

BACKGROUND ART

For preparing hot beverages, such as coffee or tea, machines are used, which comprise an infusion circuit, along which an infusion liquid, in particular water, is heated at a temperature of approximately 90° C.—or higher than that—and is injected into an infusion chamber, where the infusion product is located. For example, the infusion product can be available in the form of powder or leaves, or it can be held in capsules or pods.

Machines of the type described above, in particular for professional purposes, such as machines to be used in bars, suffer from the drawback of using a boiler for heating a liquid, in particular water, to prepare a plurality of different beverages requesting a different quantity of hot liquid. For example, a boiler of a known professional machine heats water for the preparation of both tea and coffee; therefore, in order to ensure a reliable operation of the machine even with a full load and for long amounts of time, so as to avoid having to deal with undesired waiting times, tank boilers are used, which are configured to heat different litres of water. This inevitably leads to large energy losses, as the boiler needs to always be kept active, so as to prevent the liquid contained therein from getting cold. In some cases, professional machines of the type described above are left turned on even during the night, when they are not used, so as to prevent water from getting cold and avoid having to deal with long turn-on times in the morning.

In known machines, during the dispensing by means of the dispensing assembly, the liquid gets cold and reaches a temperature that is often below the dispensing temperature desired for obtaining a beverages that can be deemed optimal from an organoleptic point of view.

Disclosure of Invention

The object of the invention is to provide a machine for preparing beverages, in particular a professional one, which is capable of significantly decreasing managing costs and of reducing the consumption of energy of professional machines, preserving at the same time the speed of reaction.

The object of the invention is to provide a dispensing assembly without priority outlets and/or outlets with a greater liquid pressure. By so doing, advantageously, the exchange surface between the liquid and the infusion product is increased, thus allowing the temperature of the liquid, namely of the beverage, to remain stable and uniform during the dispensing.

The object of the invention is to provide, in particular, a machine comprising a heat exchanger and a dispensing assembly, which allow the water temperature to be kept at a desired value during the dispensing, so as to optimize the organoleptic properties of the coffee.

The object of the invention is to provide a machine, which is capable of supplying liquid at a given temperature with a high degree of precision, in other words so that the difference between the actual temperature and the desired temperature of the liquid is limited, in order to ensure the desired organoleptic properties of the coffee.

The object of the invention is to provide a machine for preparing beverages, in particular coffee, wherein the infusion liquid, in particular water, is uniformly distributed inside the infusion chamber, so as to affect all the coffee contained inside the infusion chamber, thus improving the quality of the coffee being prepared.

The object of the invention is to provide a machine for preparing coffee, which is capable of reducing the cooling of the jet of infusion liquid for the preparation of the coffee in the moment of the infusion, so as to improve the final quality of the coffee produced.

According to the invention, there are provided a heat exchanger, an infusion assembly, a machine and a method for preparing beverages according to the appended claims.

BRIEF DESCRIPTION OF THE DRAWINGS

The invention will now be described with reference to the accompanying drawings, which show a non-limiting embodiment thereof, wherein:

FIG. 6 shows a further variant of the second detail of FIG. 1 in a plan view and on a larger scale; and FIG. 7 is a cross-section according to lines VII-VII of FIG. 6.

BEST MODE FOR CARRYING OUT THE INVENTION

Figure 1:
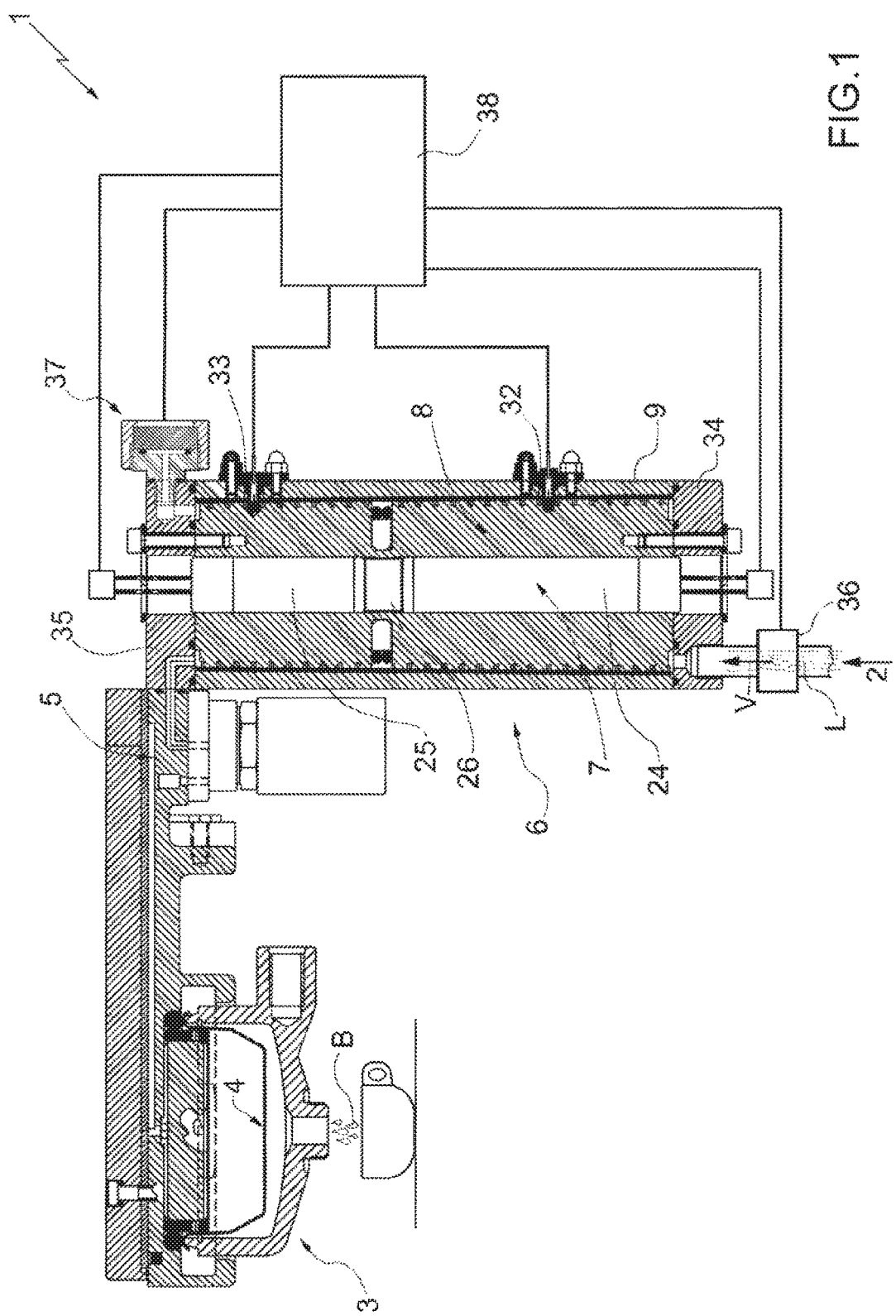
FIG. 1 is a cross-section of a main view, with some parts removed for greater clarity, of a machine according to the invention.

In FIG. 1, number 1 indicates, as a whole, a machine for preparing beverages B, in particular coffee, which comprises a supply source 2 for supplying a liquid L, in particular water, a dispensing assembly 3 with an infusion chamber 4 and an infusion circuit 5, which connects the supply source 2 to the infusion chamber 4. The infusion circuit 5 comprises, in turn, a heat exchanger 6 for the liquid L, which is proper to heat the liquid L at a predetermined temperature, for example approximately 90°, before the infusion of the liquid L inside the infusion chamber 4.

Figure 2:
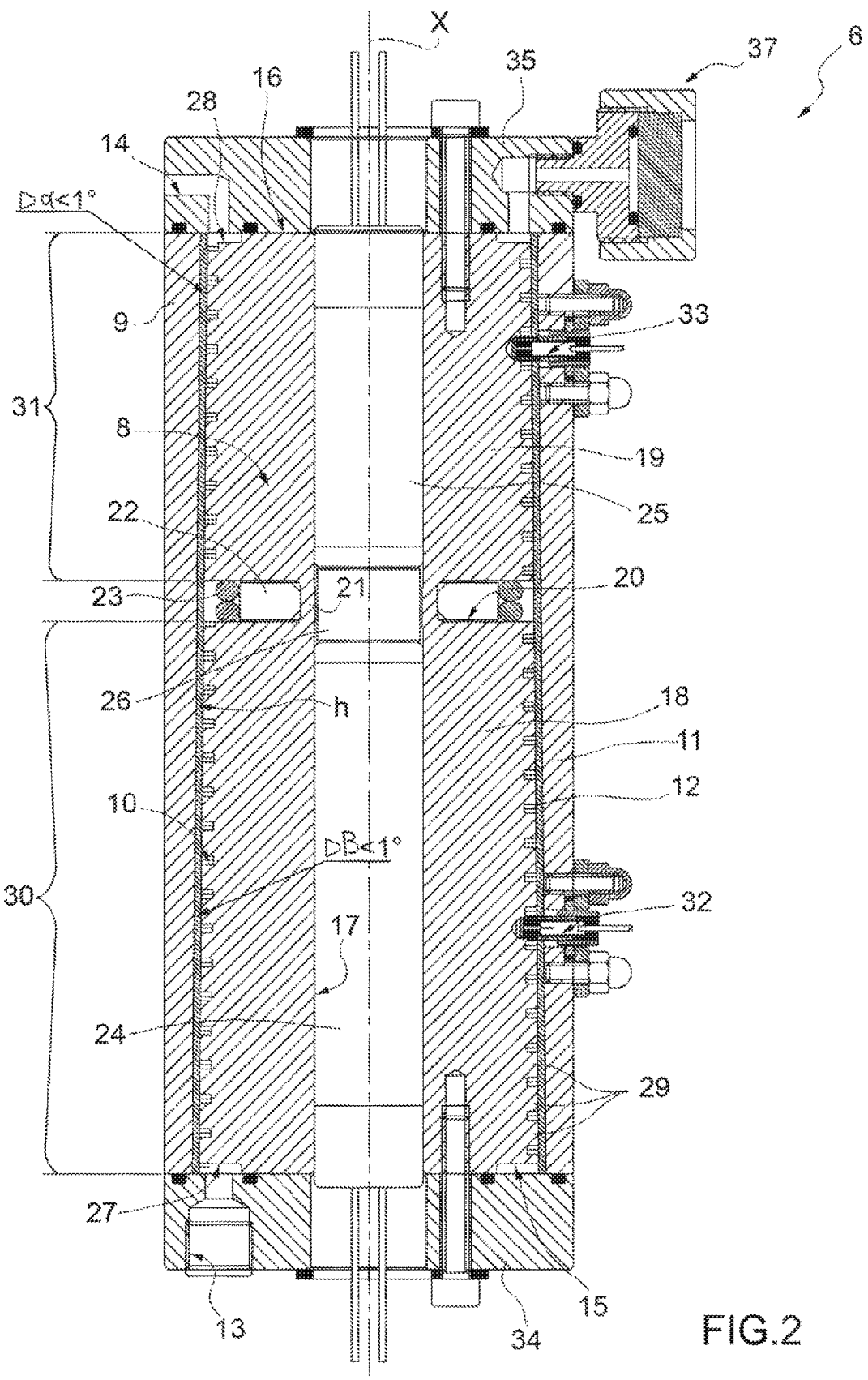
FIG. 2 shows a first detail of FIG. 1 on a larger scale.

FIG. 2 shows in detail the heat exchanger 6 of the machine 1.

FIG. 2 shows in detail the heat exchanger 6 of the machine.

The heat exchanger 6 comprises, in particular, an inner heating system 7, a heat exchanging core 8 arranged around the heating system 7 and an outer protection body 9. In particular, the heat exchanger 6 has a groove 10, which is made along the outer periphery of the core 8 and is configured to be flown through by a liquid L.

In particular, the outer body 9 is a cylindrical body having a longitudinal axis X and a longitudinal inner through cavity h. Preferably, the inner cavity h is conical. The core is inserted into the inner cavity h of the outer body 9.

The core 8 is a conical body, which is coaxial to the axis X and is made of a thermally conductive material. The inclination of the core is complementary to the one of the outer body 9, so as to be inserted into the outer body 9 by sliding longitudinally. Preferably, the core 8 has an inclination α that is smaller than 1°. Preferably, the inner cavity has an inclination β that is smaller than 1°.

Advantageously, the core 8 is made of a thermally conductive metal. For example, the core 8 is made of aluminium in order to optimize conduction. Alternatively or in addition thereto, the core 8 is made of copper.

The heat exchanger 6 comprises, furthermore, a covering 11, which is fitted around the core 8 and is arranged between the core 8 and the outer body 9. The covering 11 is configured to delimit, together with the groove 10 of the core 8, a flowing conduit 12 for the liquid L. The covering 11 is suited to tightly close the flowing conduit 12, so as to prevent the liquid L from leaking outwards.

Advantageously, the heat exchanger 6 is configured to be flown through by a liquid L at a pressure of approximately 9 bar. Advantageously, the outer body 9 is made of metal.

Advantageously, the covering 11 is made of a thermally insulating material. In particular, the covering 11 is configured to thermally shield the outer body 9 from the core 8. Advantageously, the covering 11 is configured to prevent conductive heat from being transferred between the core 8 and the outer body 9. Advantageously, the covering is made of a material that can be used in the food industry in contact with food; in particular, the covering 11 is made of a food-safe silicone.

Advantageously, the covering 11 is configured to make up for possible size errors in the manufacturing of the core 8 and of the outer body 9. In particular, the covering is configured to prevent the liquid from leaking out between the teeth of the core 8 and the outer body 9. Advantageously, the covering 11 is configured to thermally insulate the core 8. In particular, the covering 11 is configured to forbid the exchange of conductive heat between the core 8 and the outer body 9.

Advantageously, the conical shape of the inner cavity h and of the core 8 allows the assembly consisting of the core 8 and of the covering 11 fitted on it to be correctly fitted inside the inner cavity h. In other words, the conical shape of the inner cavity h and of the core 8 prevents the covering 11 from getting trapped and/or getting damaged during the assembly of the heat exchanger 6.

Advantageously, the inclination of the core 8 and/or of the inner cavity h is smaller than 1°; by so doing, the assembly consisting of the covering 11 fitted around the core 8 can be inserted into the inner cavity h almost completely without applying axial forces that might damage or plastically deform the covering 11. In other words, with an inclination smaller than 1°, the covering 11 comes into contact with the outer body 9 when the core 8 is almost completely inserted inside the inner cavity h; in this way, in order to complete the introduction, a small axial force needs to be applied to the assembly consisting of the covering 11 fitted on the core 8 in order to cause the assembly to reach its stop limit. This small axial force (which can be applied manually and is estimated to reach at most 100 N) is used to compress the covering 11 between the core 8 and the outer body 9 without damaging the covering 11 itself.

The heat exchanger 6 has an inlet 13 and an outlet 14 for the liquid L, which are configured to exchange—with the outside—the liquid L flowing into and, respectively, flowing out of the heat exchanger 6. Hereinafter, the inlet end 15 of the heat exchanger 6 is the end where the liquid inlet 13 is located and, similarly, the outlet end 16 is the end where the liquid outlet 14 is located.

The core 8 has a longitudinal inner through cavity 17, which has a circular cross-section. The inner cavity 17 faces the outside of the core 8 in the area both of the inlet end 15 and of the outlet end 16 of the core 8. The inner cavity 17 is concentric to the body of the core 8.

The core 8 is longitudinally divided into an inlet portion 18, which is adjacent to the inlet end 15, and an outlet portion 18, which is adjacent to the outlet end 16.

Advantageously, the inlet portion 13 and the outlet portion 14 of the core 8 are at least partially thermally insulated from one another. According to FIG. 2, the core 8 has an annular cavity 20, which is made between the inlet portion 18 and the outlet portion 19. The core 8 has an inner neck 21, which radially delimits the annular cavity 20 and connects the inlet portion 18 to the outlet portion 19.

Advantageously, inside the annular cavity 20, a ring 22 of thermally insulating material is fitted on the neck 21 of the core 8. Advantageously, inside the inner cavity 17, an annular covering 23 is radially fitted on the outside of the ring 22, so as to prevent the liquid L from leaking into the groove of the annular cavity 20. In particular, the annular covering 23 and the ring 22 are configured to prevent the liquid L from coming into contact with the neck 21 of the core 8, so as to prevent, in use, the liquid L from boiling in contact with the neck 21.

The inlet portion 18 has a greater extension than the extension of the outlet portion 19 along the longitudinal axis X.

According to FIG. 2, the heating system 7 comprises two resistors, hereinafter referred to as inlet resistor 24 and outlet resistor 25. The resistor arranged in the area of the inlet end 15 is the inlet resistor 24, whereas the resistor arranged in the area of the outlet end 16 is the outlet resistor 25.

Each resistor 24, 25 has a substantially cylindrical shape. The resistors 24, 25 are coaxial to one another. Each resistor 24, 25 comprises connecting cables, which project from a respective end.

The resistors 24, 25 of the heating system 7 are housed inside the inner cavity 17 of the core 8. In particular, the inlet resistor 24 is inserted inside the inner cavity 17 of the core 8 in the area of the inlet portion 18 of the core 8. Similarly, the outlet resistor 25 is inserted inside the inner cavity 17 of the core 8 in the area of the outlet portion 19 of the core 8.

Advantageously, the longitudinal extension of the inlet resistor 24 is approximately equal to the longitudinal extension of the inlet portion 18. Similarly, the longitudinal extension of the outlet resistor 25 is approximately equal to the longitudinal extension of the outlet portion 19. Advantageously, the heating system 7 comprises an insulating element 26, which is longitudinally interposed, inside the inner cavity 17 of the core 8, between the inlet resistor 24 and the outlet resistor 25.

Advantageously, the insulating element 26 is arranged inside the inner cavity 17 in the area of the annular cavity 20. The presence of the cavity 20 and of the insulating element 26 is suited to minimize the passage of heat from the inlet portion 18 to the outlet portion 19. The insulating element 26 allows heat to be transmitted between the resistors 24 and 25 and the annular cavity 20 only in very small quantities. By so doing, the heat released by the inlet resistor 24 does not affect the heating of the liquid L in the area of the outlet portion and, vice versa, the heat released by the outlet resistor does not affect the heating of the liquid L along the inlet portion 18.

Advantageously, the covering 11 shields, in the area of the annular cavity 20, the outer body 9 from the liquid L, so as to avoid losses of heat in the liquid L in the area of the annular cavity 20.

According to FIG. 2, the cables of the inlet resistor 24 project out of the core 8 in the area of the inlet end 15. Similarly, the cables of the outlet resistor 25 project out of the core 8 in the area of the outlet end 16.

According to FIG. 2, the core 8 has a helical groove 19, which is made on the radially outer wall of the core 8.

The groove 10 extends along the entire core 8 and has a mouth 27, which is made in the area of the inlet end 15 of the core 8, and a drain 28, which is made in the area of the outlet end 16 of the core 8. The groove 10 laterally delimits, on the radially outer surface of the core 8, small teeth 29. Advantageously, the covering 11 is interposed between the small teeth 29 and the outer body 9 and is configured to forbid the loss of thermal load between the small teeth 29 of the core 8 and the outer body 9.

The groove 10 is divided into an inlet section 30 and an outlet section 31. The inlet section 30 of the groove 10 is the section made along the inlet portion 18 of the core 8. The outlet section 31 of the groove 10 is the section made along the outlet portion 19 of the core 8.

Advantageously, the inlet section 30 and the outlet section 31 of the groove 10 are fluidically connected to the annular cavity 20. In particular, the groove 10 is made so as to ensure the flow of a liquid L on the radially outer wall of the core 8 from the inlet end 15 to the outlet end 16.

The heat exchanger 6 comprises, furthermore, one or more temperature sensors, each configured to determine the temperature of the core 8 in a respective position. According to FIG. 2, the heat exchanger 6 comprises an inlet sensor 32, which is configured to determine the temperature of the inlet portion 18 of the core 8. The heat exchanger 6 comprises, furthermore, an outlet sensor 33, which is configured to determine the temperature of the outlet portion 19 of the core 8.

Advantageously, the inlet sensor 32 and the outlet sensor 33 are PID (proportional-integral-derivative) sensors. Advantageously, the inlet sensor 32 is located inside a respective small tooth 29 of the inlet portion 18. The inlet sensor 32 is configured to detect the temperature of the inlet portion 18 of the core 8. Similarly, the outlet sensor 33 is located inside a respective small tooth 29 of the outlet portion 19 of the core 8. The inlet sensor and the outlet sensor 33 are not in contact with the liquid; by so doing, you can avoid measuring errors due to the contact with the liquid. Furthermore, the direct detection of the temperature of the core 8 prevents the core 8 from heating up beyond a predefined temperature threshold, so as to prevent the liquid flowing through the groove from overheating or exceeding the threshold values. In particular, the liquid is prevent from reaching the boiling point.

The heat exchanger 6 comprises, furthermore, an inlet plug 34 and an outlet plug 35, each configured to close the inlet end 15 and, respectively, the outlet end 14 of the heat exchanger 6. Advantageously, the plugs 34 and 35 are made of a thermally insulating material. In particular, the plugs 34 and 35 are made of a plastic material, so as to thermally insulate the ends 15 and 16 of the heat exchanger 6 and so as to avoid heat losses in the area of the ends 15 and 16.

Advantageously, the heat exchanger 6 comprises a flow-rate sensor 36, which is configured to determine the flow-rate of the liquid L flowing into the heat exchanger 6. According to FIG. 1, the flow-rate sensor 36 is interposed between the supply source 2 and the inlet 13 along the feeding direction v of the liquid L. The flow-rate sensor 36 is a known sensor and is shown in a schematic manner.

Advantageously, the heat exchanger 6 comprises a pressure sensor 37, which is configured to determine the pressure of the liquid flowing out of the flowing conduit 12. According to FIG. 2, the pressure sensor 37 is configured to determine the pressure of the liquid L in the area of the drain 28.

Advantageously, the heat exchanger 6 comprises a control unit 38, which is connected—in a known manner—to the flow-rate sensor 36, to the inlet sensor 32, to the outlet sensor 33 and to the pressure sensor 37.

Advantageously, the inlet resistor 24 has a power of approximately 700 Watt. Advantageously, the inlet resistor 24 is three or four times greater than the outlet resistor 25.

Advantageously, the inlet resistor 24 and the outlet resistor 25 have a variable power, so as to modulate the heating temperature along the longitudinal axis X of the core 8. In particular, the inlet resistor 24 and the outlet resistor 25 have a power that decreases along the feeding direction v of the liquid L.

Advantageously, the control unit 38 is configured to adjust the power of the inlet resistor 24 and/or of the outlet resistor 25 based on the flow-rate of the liquid L detected by the flow-rate sensor 36. The adjustment based on the flow-rate can by set by the user and influences the dispensing modes.

Figure 3:
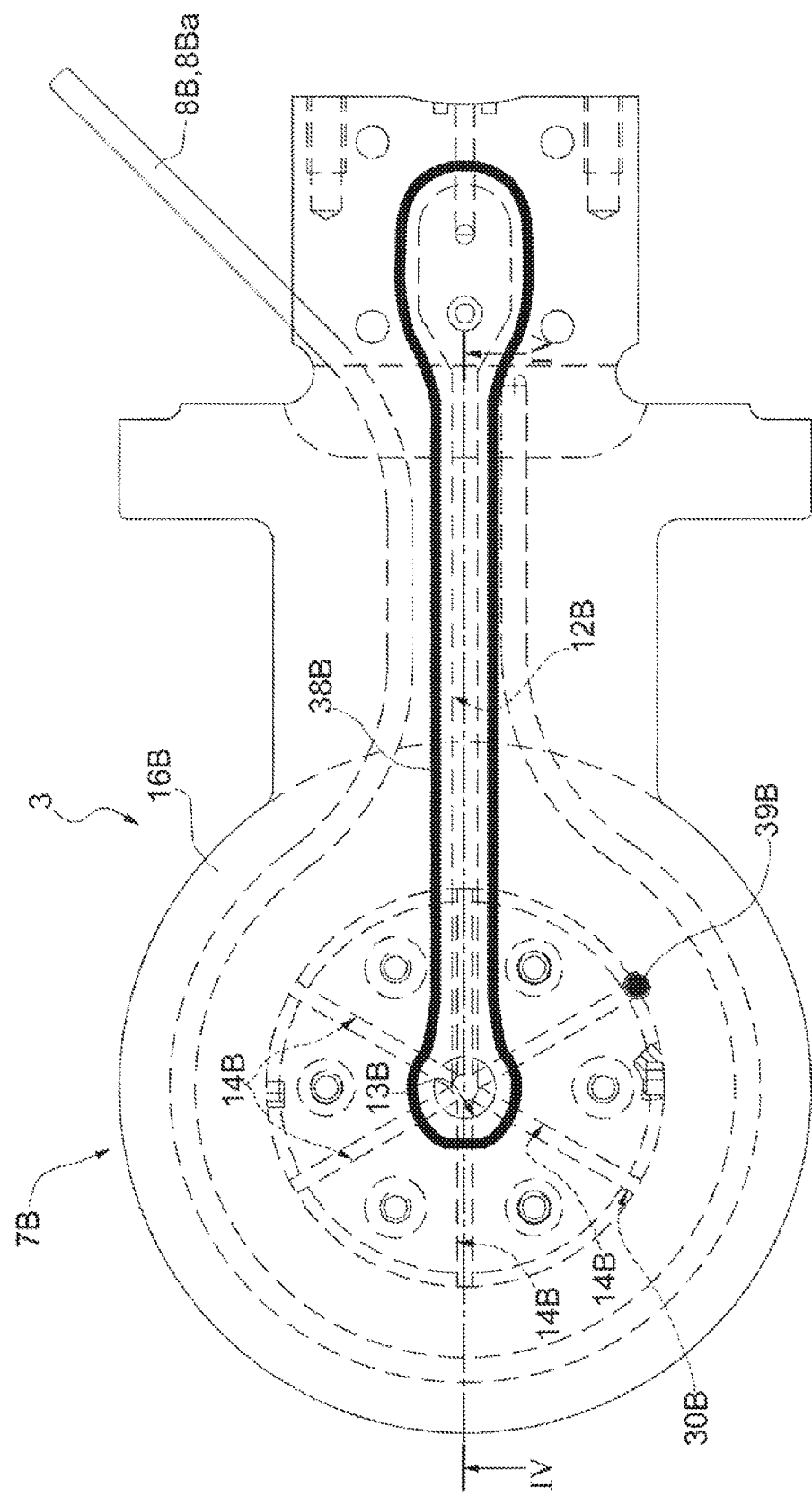
FIG. 3 is a plan view, on a larger scale, of a second detail of FIG. 1.

FIG. 3 shows in detail the dispensing assembly 3 of the machine 1.

Advantageously, the dispensing assembly 3 comprises a dispensing head 7B and a heating unit 8B. Advantageously, the heating unit 8B comprises an electrical resistor 8Ba.

According to FIGS. 3 to 7, the dispensing head 7B comprises an upper filter-carrier 9B, which is configured to engage a lower filter-carrier 10B, which is known and is shown in a schematic manner. The lower filter-carrier 10B is configured to house a lower filter 11B. The infusion chamber 4 is delimited by the lower filter 11B on the lower side. According to the figures, the lower filter-carrier 10B is an axially symmetrical body.

Advantageously, the dispensing head 7B, in particular the upper filter-carrier 9B, has a circular perimeter that substantially corresponds to the perimeter of the lower filter-carrier 10B.

Hereinafter, the terms "upper" and "lower" are used with reference to the direction of liquid L flowing out of the dispensing assembly 3.

Advantageously, the heating unit, in particular the resistor 8Ba, extends along the entire circular perimeter of the dispensing head 7B, in particular of the upper filter-carrier 9B, so as to uniformly heat the entire dispensing head 7B.

The substantially circular shape of the resistor 8B, which is configured to substantially surround, on the outside, the entire perimeter of the upper filter-carrier 9B, allows the temperature of the dispensing head 7B to be kept substantially constant at a desired temperature, in particular in the area affected by the flowing of the liquid L. This prevents the liquid L flowing out of the exchanger 6B from getting cold. Therefore, the heating unit 8B, in particular the resistor 8Ba, of the dispensing head 7B enables an improvement of the organoleptic quality of the beverage B.

Advantageously, the dispensing head 7B has a dispensing conduit 12B, which is connected in a known manner to a heating system and is configured to receive a hot liquid L to be dispensed into the infusion chamber 4.

The dispensing head 7B has, furthermore, a confluence area or chamber 13B, into which the dispensing conduit leads, and a plurality of distribution conduits 14B, which are fluidically connected to the confluence area or chamber 13B and are configured to inject the liquid L into the infusion chamber 4. Advantageously, the distribution conduits are arranged in a radial pattern around the confluence area or chamber 13B. Advantageously, the distribution conduits 14B are uniformly distributed around the confluence area or chamber 13B and are configured to uniformly inject the liquid L into the infusion chamber 4, as you can read more in detail below.

Advantageously, the upper filter-carrier 9B comprises a support body 15B, a closing body 16B and a shower head 17B. The support body 15B is interposed between the closing body 16B and the shower head 17B. The shower head 17B projects from the support body 15B on the lower side.

Advantageously, the shower head 17B has a substantially cylindrical shape and has a longitudinal axis. The shower head 17B is configured to be arranged, in use, inside the lower filter 11B and in configured to delimit the infusion chamber 4 on the upper side (figure Preferably, the shower head 17B comprises, in turn, a distributor 18B, a casing 19B and an upper filter 20B. As you can read more in detail below, the shower head 17B is configured to be at least partially inserted into the lower filter-carrier 10B. Preferably, the shower head 17B has a shape and a size that correspond to the ones of the lower filter 11B. According to FIG. 1, the shower head 17B is axially symmetrical.

According to FIGS. 3 to 7, the distributor 18B has, in particular, an upper wall 21B, a lower wall 22B and a side wall 23B. Advantageously, the distributor 18B is made of a material having a thermal conductivity coefficient k that is equal to or greater than 100B W/(mK). For example, the distributor 18B is made of brass. The casing 19B is a tubular body. In particular, the casing 19B has an annular section and is delimited, at its longitudinal ends, by an upper surface 24B and a lower surface 25B, whereas it is radially delimited by an inner surface 26B and an outer surface 27B. The dimensions of the casing 19B are such as to contain, on the inside, the distributor 18B. Preferably, the casing 19B is made of a material having a thermal conductivity coefficient that is equal to or greater than 100B W/(mK). For example, the casing 19B is made of brass.

The casing 19B has an inner cavity 29B. The distributor is inserted into the inner cavity 29B of the casing 19B. Advantageously, the casing 19B and the distributor 18B project from the support body 15B on the lower side. In other words, the upper wall 21B of the distributor 18B and the upper surface 24B of the casing 19B are in contact with the support body 15B. Advantageously, the large area of contact between the support body 15N and the distributor 18B and, respectively, the casing 19B allows the heat to be better transmitted and the temperature to be more uniform and more easily kept at a predetermined value.

According to FIGS. 3 to 7, the upper filter 20B is connected to the casing 19B close to the lower surface 25B, so as to form, together with the casing 19B, a cup-shaped body 28B housing the distributor 18B. The upper filter 20B is connected to the casing 19B in a known manner, for example by means of gluing and/or welding and/or interlocking and/or screws or the like. Advantageously, the upper filter 20B (known and shown in a schematic manner) has a plurality of holes with dimensions in the range of some tenths of millimetre, which are uniformly distributed.

According to FIGS. 3 to 7, in detail, the confluence chamber 13B is made between the distributor 18B and the support body 15B.

Advantageously, the distribution conduits 14B are obtained in the distributor 18B. In particular, the distribution conduits 14B are radial conduits, which are uniformly distributed around the longitudinal axis AA. In particular, the conduits are obtained close to the upper wall 21B and face the support body 15B. By so doing, the exchange of heat between the support body 15B and the distributor 18B is optimized so as to keep the temperature between the distribution conduits 14B and the support body 15B as uniform as possible.

Advantageously, the distributor 18B is inserted into the casing 19B with a clearance. In other words, there is a small area of passage between the side wall 23B of the distributor 18B and the inner surface 26B of the casing 19B. In other words, there is a small meatus 30B between the distributor 18B and the inner surface 26B of the casing 19B.

Advantageously, the meatus 30B has the shape of a circular crown concentric to the distributor 18B. Advantageously, the thickness of the meatus 30B is variable, in particular decreasing, in the direction of flowing of the liquid L. The thickness of the meatus 30B measures approximately ¹⁄₁₀ of mm.

Advantageously, the shower head 17B has a dispensing chamber 31B, which is arranged, along the feeding direction of the liquid L, upstream of the upper filter 20B. In particular, the meatus 30B leads into the dispensing chamber 31B. The dispensing chamber 31B is interposed between each distribution conduit and the upper filter 20B.

Advantageously, the casing 19B has a flow deflector 31B, which projects into the inner cavity 29B and is configured to deflect the flow of the liquid L flowing out of the meatus 30B towards the longitudinal axis, namely towards the centre of the inner cavity 29B.

Figure 4:
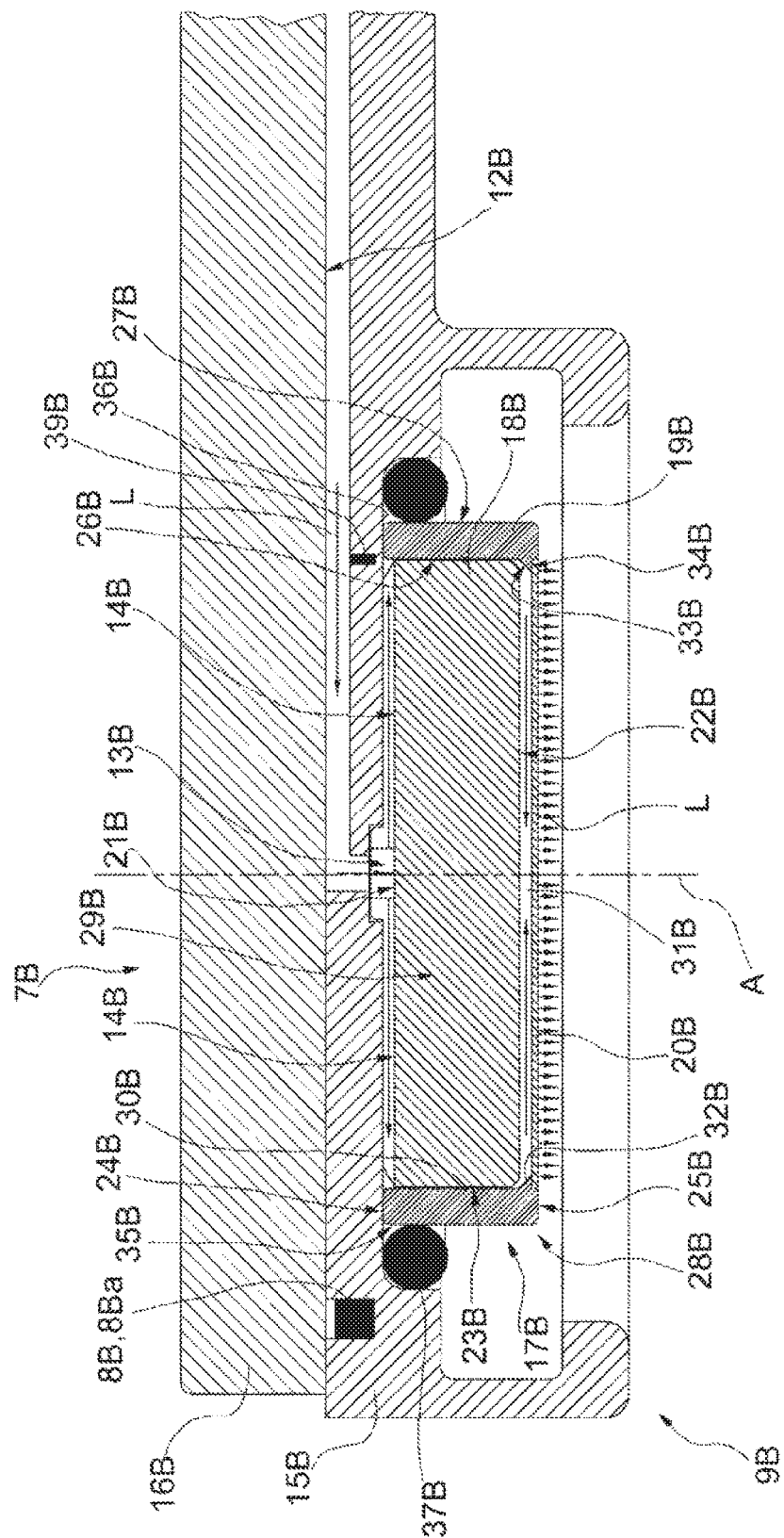
FIG. 4 shows a cross-section according to line IV-IV of FIG. 3.
Figure 5:
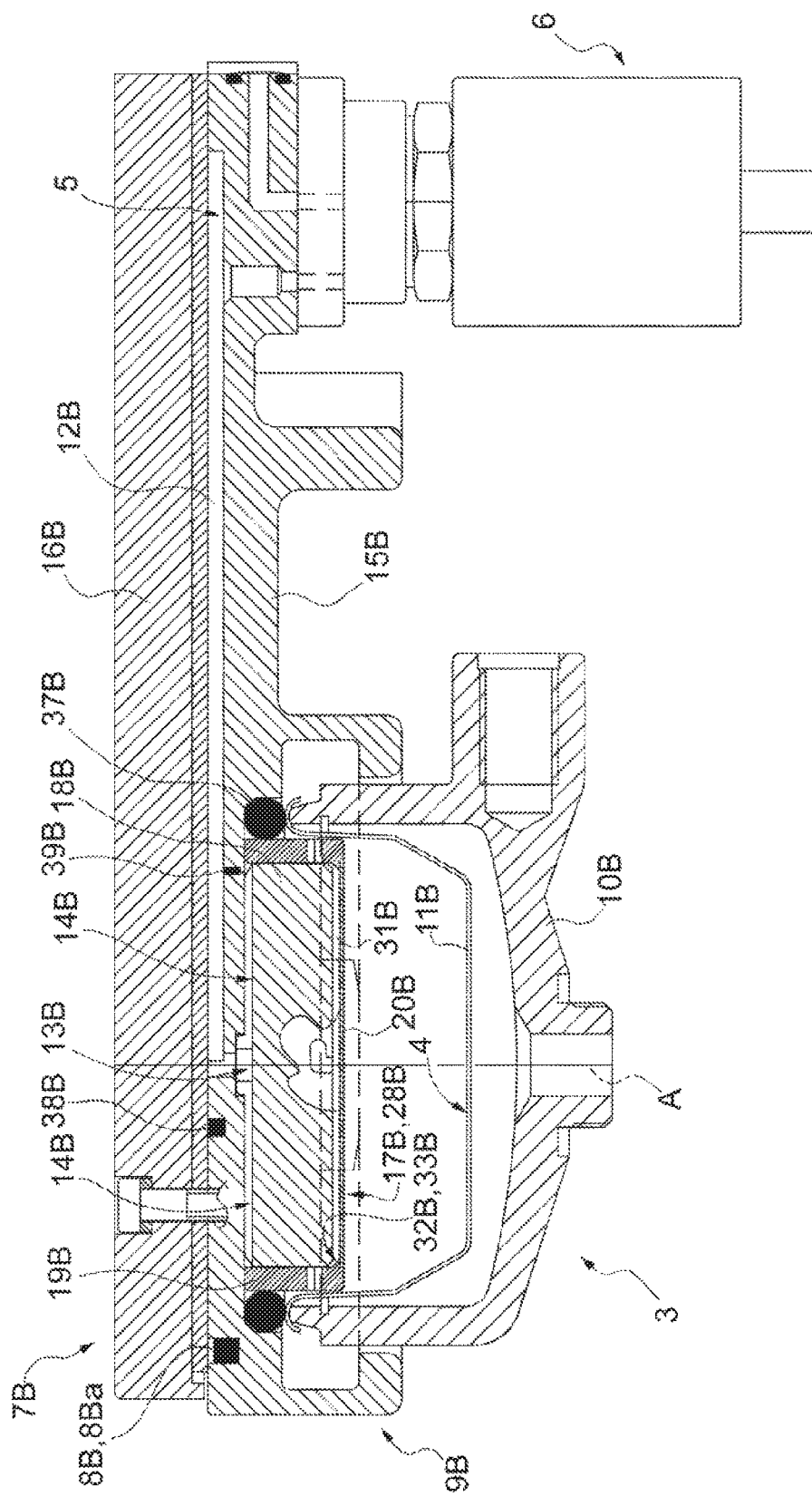
FIG. 5 is similar to FIG. 4 and shows, in a cross-section view, a variant of the second detail of FIG. 1.

According to FIG. 4, the flow deflector 31B comprises an inclined wall 33B relative to the longitudinal axis, which projects from the inner surface 26B of the casing 19B into the inner cavity 29B. The inclined wall 33B is substantially arranged in the area of the lower surface 25B. According to FIG. 4, the inclined wall 33B is interposed, along the longitudinal axis A, between the distributor 18B and the upper filter 20B.

According to FIG. 4, the inclined wall 33B forms an annular abutment 34B, which radially projects into the inner cavity 29B. The upper filter 20B is inserted into the inner cavity 29B ans strikes against the annular abutment 34B.

According to the example shown in FIG. 4, the dispensing chamber 31B is laterally delimited by the inclined wall 33B of the casing 19B and, along the longitudinal axis, by the lower wall 22B of the distributor 18B and by the upper filter 20B.

The confluence chamber 13B, the distribution conduits 14B, the meatus 30B and the dispensing chamber 31B are sized so as to have an increasing passage section for the liquid L in its feeding direction. In other words, the sum of the passage sections of the distribution conduits 14B is equal to or greater than the passage section of the dispensing conduit 12B. Similarly, the passage section of the meatus 30B (which extends around the entire circumference of the distributor 18B) is greater than the sum of the passage sections of the distribution conduits 14B. Finally, the inlet section of the dispensing chamber 31B is equal to or greater than the section of the meatus 30B. Therefore, the liquid L, while flowing through the shower head 17B, does not increase its inner pressure.

Furthermore, by so doing, you can increase and maximize the area of contact between the liquid L and the shower head 17B; hence, the exchange of heat between the liquid L and the shower head 17B is maximized. In this way, you can ensure a maximum stability of the temperature of the liquid L flowing out of the dispensing head 7B. In particular, you can make sure that the liquid L is dispensed into the infusion chamber 4 at the desired temperature.

Furthermore, the presence of the dispensing chamber 31B and of the flow deflector 31B allows the liquid L to be distributed in a uniform manner in the dispensing chamber 31B, so as to obtain a uniform percolation of the liquid L through the upper filter 20B. In other words, thanks to the dispensing chamber 31B, you can obtain a uniform percolation of the liquid L flowing out of the dispensing assembly 3.

The shower head 17B is connected to the support body 15B by means of known connection means, such as for example releasable connection means, such as screws. According to FIG. 5, the shower head 17B comprises a geometric coupling system between the distributor 18B and the casing 19B, so as to permit a shape connection between the distributor 18B and the casing 19B.

Advantageously, the dispensing head 7B comprises centring elements 35B so as to ensure a correct assembly of the shower head 17B; in particular, so as to ensure a correct mutual positioning between the distributor 18B and the casing 19B.

According to FIG. 4, the support body 15B has a recess, which is configured to position the casing 19B and to house an annular gasket 37B, which is fitted around the casing 19B and is arranged between the casing 19B and the support body 15B, so as to prevent the liquid L from leaking out during the use.

Advantageously, the dispensing assembly 3 comprises a gasket 38B, which is interposed between the support body 15B and the closing body 16B so as to surround the dispensing conduit 12B and prevent the liquid L from leaking out during the use.

Advantageously, the dispensing assembly 3 comprises a temperature sensor 39B, which is configured to detect the temperature of the dispensing assembly 3. Preferably, the temperature sensor 39B is arranged in the support body 15B and is aligned, along the longitudinal axis A, with the area of contact between the side wall 23B of the distributor 18B and the inner surface 26B of the casing 19B, as the temperature detected in this position is the most representative sample of the dispensing assembly 3.

In FIGS. 6 and 7, number 3' indicates, as a whole, a variant of the dispensing assembly 3. The components of the dispensing assembly 3' that are also present in the dispensing assembly 3 are identified, hereinafter and in FIGS. 6 and 7, by the same reference numbers. Generally speaking, the dispensing assembly 3' comprises a large number of the components of the dispensing assembly 3 described above and differs from the latter in the features described below.

In particular, the dispensing assembly 3' has a distribution chamber 114B instead of the distribution conduits 14B of the dispensing assembly 3 and connection conduits 130B instead of the meatus 30B. According to FIG. 7, the distributor 18B and the casing 19B are manufactured as one single body.

According to FIG. 7, the confluence chamber 13B directly faces the inside of a distribution chamber 114B. The distribution chamber 114B has a shape that, in its plan view, substantially corresponds to the shape of the distributor 18B. The height of the distribution chamber 114B is defined by the distance, along the axis A, between the distributor 18B and the support body 15B.

Advantageously, the dispensing assembly 3' has one or more connection conduits 130B, which are configured to connect the distribution chamber 114B to the dispensing chamber 31B. According to FIG. 7, the dispensing assembly 3' has a plurality of connection conduits 130B, which are uniformly distributed around the periphery of the distribution chamber 114B.

According to FIG. 7, the dispensing assembly 3' does not comprise the flow deflector 32B. According to a variant, which is not shown herein, the dispensing assembly 3' comprises the flow deflector 32B, as well.

Advantageously, the dispensing assembly 3' comprises an upper filter 20B made of a ferromagnetic material. Advantageously, the dispensing assembly 3' comprises one or more magnets 41B, which are configured to fix the upper filter 20B to the casing 19B in a releasable manner. According to FIG. 7, the casing 19B has three cavities 42B and each cavity 42B houses, on the inside, a respective magnet 41B. Each magnet 41B is configured to cause, in use, the upper filter 20B to remain attached the casing 19B. According to FIG. 6, the magnets 41B are uniformly distributed around the distributor 18B.

The presence of the magnets 41B to fix the upper filter 20B to the casing 19B makes it easier for users to install and remove the upper filter 20B. As a matter of fact, users can remove the filter 20B by simply applying a force, for example by means of a blade, between the casing 19B and the upper filter 20B. This allows users to easily remove the upper filter 20B even when it reaches high temperatures (usually around 90° C.) and it cannot be touched with bare hands. Furthermore, in order to install the upper filter 20B, users simply need to place it in the right position, so that the magnets 41B are activated and keep it attached to the casing 19B. Therefore, the easier removal and installation of the upper filter 20B allow users to frequently and easily wash the upper filter 20B, thus ensuring a greater quality of the beverage B. Furthermore, the frequent washing of the filter 20B leads to a greater cleanliness of the machine 1 and to the removal of burnt coffee particles, which have gathered on the upper filter 20B and are potentially carcinogenic.

According to a variant, which is not shown herein, the dispensing assembly 3 comprises a fixing system for the upper filter 20B, which is similar to the one shown for the dispensing assembly 3'. In other words, according to a variant, which is not shown herein, the dispensing assembly 3 comprises one or more magnets 41B to fix an upper filter 20B made of a ferromagnetic material to the casing 19B in a releasable manner.

Advantageously, the machine 1 comprises a control uni 38, which is connected in a known manner to the heating unit 8B and to the temperature sensor 39B of the dispensing assembly 3 or 3'. Advantageously, the control unit 38 is configured to adjust the power of the heating unit 8B based on the temperature detected by the temperature sensor 39B. In particular, the control unit 38 is configured to increase the power of the heating unit 8B in case the detected temperature is lower than the desired temperature and, vice versa, to reduce the power in case the detected temperature is higher than the desired temperature.

Owing to the above, the dispensing assembly 3 or 3' described above allows the infusion chamber 4 to receive a liquid L at the optimal desired temperature. Furthermore, the dispensing assembly 3 or 3' described above has the advantage of ensuring the stability of the temperature of the dispensed liquid L even in case the temperature of the liquid L coming from the heating system is below a standard value.

Furthermore, the special conduit system obtained inside the dispensing assembly 3 or 3' allows the liquid L to be dispensed through the upper filter 20B and into the infusion chamber 4 in a stable and uniform manner. Furthermore, the special conduit system of the dispensing assembly 3 or 3' allows the exchange of heat with the heating unit 8B to be maximized.

In addition, the special conduit system of the dispensing assembly 3 or 3' allows users not to increase the pressure of the liquid L as it flows through the shower head 17B. By so doing, users avoid the formation of preferred conduits or channels for the liquid L flowing out of the upper filter 20B and into the infusion chamber 4. Therefore, the liquid L flowing through the infusion chamber 4 is uniform, so as to maximize the quality and the organoleptic properties of the beverage B flowing out of the infusion chamber 4.

In use, a liquid L, in particular water, for preparing a beverage B, such as coffee, is sent to the heat exchanger 6 from a supply source, through the flow-rate sensor 36, at an initial temperature usually corresponding to the room temperature of approximately 15-30° C., usually ranging from 19° C. to 22° C., depending on the season. The flow-rate sensor 36 detects the flow-rate of the liquid L flowing into the heat exchanger 6 and exchanges the detected data with the control unit 38 in a known manner.

The liquid L is supplied into the flowing conduit 12 of the heat exchanger 6 through the mouth 27 of the core 8. Then, the liquid L flows along the entire flowing conduit 12 from the mouth 27 to the drain 28. As it flows through the flowing conduit 12, the liquid L exchanges heat, mainly in a conductive manner, with the core 8 and gets heated up. For example, the liquid L flowing out of the heat exchanger 6 should have a temperature ranging from 90° C. to 96° C., so as to optimize the organoleptic properties and, hence, the quality of the coffee.

The pressure sensor 37 detects the pressure of the liquid L flowing out of the heat exchanger 6.

The inlet sensor 32 and the outlet sensor 33 detect the temperature of the core 8 close to the inlet 13 and, respectively, the outlet 14.

The control unit 38 adjusts the operation of the inlet resistor 24 and of the outlet resistor 25 based on the data obtained from the inlet sensor 32, from the outlet sensor 33 and/or from the flow-rate sensor 36.

Advantageously, the inlet resistor 24 of the heat exchanger 6 is operated so as to heat the core 8 at a maximum power in the area of the inlet end 13. The inlet resistor 24 and the outlet resistor 25 are modulated, in particular with a decreasing power, along the axis of the core 8 from the inlet 13 to the outlet 14, so as to heat the outlet portion 19 of the core 8 close to the outlet end 16 at a minimum power.

The liquid L, by flowing inside the heat exchanger 6, substantially increases its temperature as it gets through the inlet portion 18. In particular, the liquid L goes from the initial temperature to an intermediate temperature of approximately 82-88° C. This means that the liquid L, as it flows through the inlet section 30 made in the inlet portion 18, increases its temperature by approximately 60-70° C.

Namely, the inlet portion 18 of the core 8 is suited to cause the liquid L to reach the aforesaid temperature.

On the other hand, as it flows through the outlet section 31 made in the outlet portion 19, the liquid L is heated up by a few degrees Celsius, in the range of approximately 5-10 degrees Celsius, so as to stabilize the temperature of the liquid L at the desired final temperature.

In other words, the outlet portion 19 of the heat exchanger 6 is the portion that enables a fine adjustment of the temperature of the liquid L flowing out of the heat exchanger 6.

Advantageously, the outlet portion 19 of the core 8 is kept at a substantially constant temperature. Advantageously, the outlet portion 19 of the core 8 allows users to obtain a final temperature of the liquid L of the outlet 14 that is substantially stable and equal to the desired temperature. In other words, the precision in reaching the final temperature of the liquid L flowing out of the outlet 14 of the heat exchanger 6 is substantially kept below 1° C. thanks to the presence of the outlet portion 19 of the core 8.

Advantageously, the inlet sensor 32 and the outlet sensor 33 are connected to the control unit 38, which is configured to adjust the heating of the inlet resistor 13 and of the outlet resistor 14. The inlet sensor 32 and the outlet sensor 33 are configured to determine the temperature of the inlet portion 18 and, respectively, of the outlet portion 14 of the core 8, which substantially depend on the speed and on the temperature of the liquid L flowing through the heat exchanger 6. In case the temperature values detected by the inlet sensor 32 and the outlet sensor 33 are different from set reference values, the control unit 38 acts upon the inlet resistor 24 and the outlet resistor 25, changing their operation.

The heat exchanger 6 described above is configured to carry out a plurality of successive dispensing processes at a speed of the liquid L for producing beverages which can approximately range from 80 to 350 cc per minute.

The heat exchanger 6 described above has the advantage of being small compared to a traditional boiler. The heat exchanger 6 described above has the advantage of hydraulically connecting the mouth 27 of the groove 10 directly to a tradition water network; in other words, the heat exchanger 6 described above has the advantage of eliminating the presence of a supply tank for the liquid L, thus remarkably reducing the space taken up by the machine 1 for preparing beverages.

Furthermore, the heat exchanger 6 described above has the advantage of using running liquid; by so doing, the machine 1 does not have areas where the liquid L stagnates, namely areas with still water, contrary to what happens in the tanks of known machines. In this way, the machine 1 has the advantage of cancelling the risk of bacterial growth in its inner parts, due to the stagnation of the liquid L.

The heat exchanger 6 described above allows users to obtain, during a first dispensing cycle starting with the machine 1 turned off, a quantity of liquid for preparing beverage at a mean temperature of 92° C. within 5 minutes after having turned on the machine 1 and with a precision in reaching the desired temperature of approximately 1° C.

The heat exchanger 6 described above has the advantage of modulating, in very short amounts of time, namely within a few minutes, the final temperature of the dispensed liquid L depending on the needs of the consumer.

The heat exchanger 6 described above has the advantage of minimizing the waste of energy and the consumption of electrical energy is limited to the production of each single coffee.

The heat exchanger 6 described above has the advantage of permitting a continuous operation, always ensuring an optimal quality of each coffee made. In particular, compared to known systems, the heat exchanger 6 described above does not suffer from the drawback of sudden changes in the temperature of the infusion water in case of production of many or a few coffees.

The heat exchanger 6 described above, due to its small dimensions and reduced weight, has the advantage of being directly connected to a single and respective dispensing assembly 3, so as to form a supply unit; by so doing, the machine 1 for preparing beverages can be modular and comprise a composition of a plurality of supply units. Advantageously, the supply units can be used separately from one another, so as to be positioned in different places of a bar, according to the specific needs of the bar.

The invention claimed is:

1. A heat exchanger for a machine for preparing beverages, the heat exchanger comprising:
   a flowing conduit for a liquid for preparing a beverage; and
   a heating system, which is configured to heat and keep an inlet section of the flowing conduit within a first range of predefined temperatures, and an outlet section of the flowing conduit within a second range of predefined temperatures, the heating system including inlet resistor means to heat an inlet portion of the heat exchanger where there is the inlet section of the flowing conduit and outlet resistor means to heat an outlet portion of the heat exchanger where there is the outlet section of the flowing conduit;
   a core having a longitudinal axis and an inner cavity fitted around the inlet resistor means and the outlet resistor means of the heating system;
   an outer body fitted around the core, the core having a groove on its outer surface facing the outer body; and
   an elastic and thermally insulating covering interposed between the core and the outer body, wherein the groove and the covering laterally delimit the flowing conduit.

2. The heat exchanger according to claim 1, wherein the inlet resistor means and/or the outlet resistor means have a variable power, so as to modulate the heating temperature along their longitudinal extension.

3. The heat exchanger according to claim 1, wherein the inlet resistor means and the outlet resistor means are modulated with a decreasing power in the feeding direction of the liquid inside the flowing conduit.

4. The heat exchanger according to claim 1, wherein the inlet resistor means are configured to increase a temperature of the liquid by approximately 60-70 degrees Celsius, and wherein the outlet resistor means are configured to increase a temperature of the the liquid by approximately 5-10 degrees Celsius.

5. The heat exchanger according to claim 1, wherein the covering longitudinally extend on the entire outer surface of the core.

6. The heat exchanger according to claim 1, wherein the heating system, the core, the covering and the outer body are conical and coaxial to one another relative to the longitudinal axis.

7. The heat exchanger according to claim 1, wherein the groove is helical.

8. The heat exchanger according to claim 1, wherein the covering is made of a product that can be used in the food industry in contact with food.

9. The heat exchanger according to claim 1, further comprising thermally insulating means arranged inside the inner cavity of the core, wherein the thermally insulating means are interposed, along the longitudinal axis, between the inlet resistor means and the outlet resistor means.

10. The heat exchanger according to claim 1, wherein the core has an annular cavity configured to separate, along a body of the core, the inlet portion and the respective inlet section of the flowing conduit from the outlet portion and the respective outlet section.

11. The heat exchanger according to claim 1, further comprising a first temperature sensor, which is configured to detect the temperature of at least part of the inlet portion, and a second temperature sensor, which is configured to detect the temperature of at least part of the outlet portion, wherein the first and the second temperature sensor are insulated from the flowing conduit and arranged inside the core.

12. The heat exchanger according to claim 1, further comprising a control unit, flow-rate detection means for detecting the flow-rate of the liquid, and pressure detection means for detecting the pressure of the liquid, wherein the flow-rate detection means, the pressure detection means, and the first temperature sensor and the second temperature sensor are configured to exchange the detected flow-rate and detected pressure with the control unit, and wherein the control unit is configured to adjust the power of the inlet resistor means and/or of the outlet resistor means.

13. A machine for preparing beverages comprising a liquid supply source supplying a liquid, an infusion chamber and an infusion circuit, which connects the liquid supply source to the infusion chamber, the machine including a heat exchanger according to claim 1.

14. The machine according to claim 13, further comprising a dispensing assembly including:
   a heating unit and
   a shower head configured to dispense, in use, a liquid into an infusion chamber of the machine for preparing beverages, wherein the heating unit is configured to heat the shower head at a predetermined temperature.

15. The machine according to claim 14, further comprising a control unit, which is connected to the temperature sensor and to the heating unit, wherein the control unit is configured to adjust the heating unit depending on the temperature detected by the temperature sensor.

16. A method for preparing beverages by means of a machine comprising a liquid supply source supplying a liquid, an infusion chamber and an infusion circuit, which connects the supply source to the infusion chamber, wherein the infusion circuit comprises, in turn, a heat exchanger according to claim 1 and comprising a flowing conduit for a liquid for preparing beverage and a heating system, the method comprises:
   supplying a liquid to the infusion circuit by means of the supply source;
   supplying the liquid into the infusion chamber for preparing a beverage;
   supplying the liquid to the heat exchanger at the inlet of the flowing conduit;
   heating the liquid within a first range of predefined temperatures as it flows along an inlet section of the flowing conduit; and
   heating the liquid within a second range of predefined temperatures as it flows along an outlet section of the flowing conduit.

17. The method according to claim 16, wherein a temperature of the liquid, as it flows along the inlet section, is increased by approximately 60-70 degrees Celsius in the inlet portion.

18. The method according to claim 16, wherein a temperature of the liquid, as it flows along the outlet section, is increased heated by approximately 5-10 degrees Celsius in the outlet portion.

19. The method according to claim 16, wherein, as the liquid flows along the inlet section, the liquid goes from the room temperature to an intermediate temperature close to a desired final temperature, wherein, as the liquid flows along the outlet section, the liquid goes from the intermediate temperature to the desired final temperature.

20. The method according to claim 16, wherein the inlet section of the flowing conduit is heated by means of inlet resistor means with a variable power, wherein the inlet resistor means are adjusted in such a way that a temperature difference between the liquid and the inlet portion is maximum proximate to the inlet portion of the flowing conduit.

21. The method according to claim 16, wherein the outlet portion, where there is the outlet section of the flowing conduit, is heated by means of outlet resistor means, wherein the heating power of the outlet resistor means is constant, so as to heat the outlet portion at a temperature that is substantially equivalent to a final temperature desired for the liquid.

22. The method according to claim 16, wherein the machine comprises a control unit, flow-rate detection means for detecting the flow-rate of the liquid flowing into the flowing conduit and pressure detection means for detecting the pressure of the liquid flowing out of the flowing conduit, wherein the flow-rate detection means and the pressure detection means are configured to exchange the detected flow-rate and detected pressure with the control unit, wherein the control unit is configured to adjust the operating power of the inlet resistor means and of the outlet resistor means, wherein the method, during the heating step, further comprises adjusting the operating power of the inlet resistor means and/or of the outlet resistor means based on the data detected by the flow-rate detection means.

23. The method according to claim 16, wherein the machine comprises a control unit and a first and a second temperature sensor, wherein the first temperature sensor is configured to detect the temperature of at least part of the inlet portion and the second temperature sensor is configured to detect the temperature of at least part of the outlet portion, wherein the first and the second temperature sensor are configured to exchange the detected flow-rate and detected pressure with the control unit, wherein the control unit is configured to adjust the operating power of the inlet resistor means and of the outlet resistor means based on the data exchanged with the first and/or the second temperature sensor.

24. The method according to claim 16 and by means of a machine for preparing beverages, comprising a liquid supply source supplying a liquid, an infusion chamber and an infusion circuit, which connects the supply source to the infusion chamber, wherein the dispensing assembly is heated at a desired temperature based on the desired temperature of the liquid flowing out of the dispensing assembly.

* * * * *